United States Patent
Chung

(10) Patent No.: US 7,463,513 B2
(45) Date of Patent: Dec. 9, 2008

(54) MICRO-MACHINERY MEMORY DEVICE

(75) Inventor: Shine Chien Chung, Taipei Hsien (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 656 days.

(21) Appl. No.: 11/208,976

(22) Filed: Aug. 22, 2005

(65) Prior Publication Data

US 2007/0053219 A1    Mar. 8, 2007

(51) Int. Cl.
*G11C 11/02* (2006.01)
(52) U.S. Cl. .................................. 365/164; 365/158
(58) Field of Classification Search ............ 365/164, 365/166
See application file for complete search history.

(56) References Cited

U.S. PATENT DOCUMENTS

| | | | | |
|---|---|---|---|---|
| 7,046,539 | B1 * | 5/2006 | Gilkey et al. | 365/164 |
| 7,336,527 | B1 * | 2/2008 | McClelland | 365/164 |
| 7,349,236 | B2 * | 3/2008 | Lin et al. | 365/129 |

* cited by examiner

*Primary Examiner*—Tan T. Nguyen
(74) *Attorney, Agent, or Firm*—K & L Gates LLP

(57) ABSTRACT

A micro-motor memory device includes at least one rotor having at least one indicator for rotating about an axis; and at least one stator placed adjacent to the rotor for electromagnetically or physically engaging the rotor to rotate the indicator to at least one predetermined angular position for representing stored data. The rotor and the stator are constructed on a semiconductor substrate by using micro-electro-mechanic-system technology.

20 Claims, 3 Drawing Sheets

MICRO-MACHINERY MEMORY DEVICE

BACKGROUND

The present invention relates generally to integrated circuit (IC) designs, and more particularly to a micro-machinery memory device for data storage.

The term "micro-electro-mechanic-system" (MEMS) is used to describe electrically-controlled mechanical parts fabricated using semiconductor manufacturing technology. MEMS technology has been recognized as one of the most promising technologies for its potential in making electromechanical devices or machines in scales of micrometers or nanometers. Examples of commonly used micro-machines include switches, actuators, electrical motors, accelerators, etc. Many of those micro-machines can be found in parts for automobile air bags, ink injection components for inkjet printers and other bio-medical devices.

Some micro-machines have been developed to function as memory devices in substitution for conventional non-volatile memory, which may store data by using electrical fuses, anti-fuses or floating gates. The fuse-based memory devices can only be programmed once, and are, therefore, referred to as one time programming (OTP) memory. The floating-gate-based memory devices can be programmed multiple times, and are, therefore, referred to as multiple times programming (MTP) memory.

While the floating-gate-based memory has been frequently used for mass data storage, it has certain drawbacks. A floating gate memory cell stores a data bit by trapping electrons injected through a gate oxide within its floating gate. The gate oxide of the memory cell may fail after many programming cycles. Moreover, since each floating gate memory cell is designed to store only one bit of data, a large memory array is usually required for the memory to store a large number of data.

Among various micro-machines, micro-relays have been used as memory devices for mass data storage. Each micro-relay within the micro-relay memory device has "on" and "off" states that can be used to represent a bit of data. Thus, it can avoid the gate oxide failure problem that may happen to a conventional floating gate memory device. However, the micro-relay memory device is bulky in size, since each of the micro-rely can have a width longer than 100 µm. This renders the application of the micro-relay memory devices impractical.

As such, it is desirable to have a micro-machine memory device for data storage without requiring a large implementation area.

SUMMARY

The present invention discloses a micro-motor memory device. In one embodiment of the present invention, the micro-motor memory device includes at least one rotor having at least one indicator for rotating about an axis; and at least one stator placed adjacent to the rotor for electromagnetically or physically engaging the rotor to rotate the indicator to at least one predetermined angular position for representing stored data. The rotor and the stator are constructed on a semiconductor substrate by using micro-electro-mechanic-system technology.

The construction and method of operation of the invention, however, together with additional objectives and advantages thereof will be best understood from the following description of specific embodiments when read in connection with the accompanying drawings.

DESCRIPTION

Figure 1:
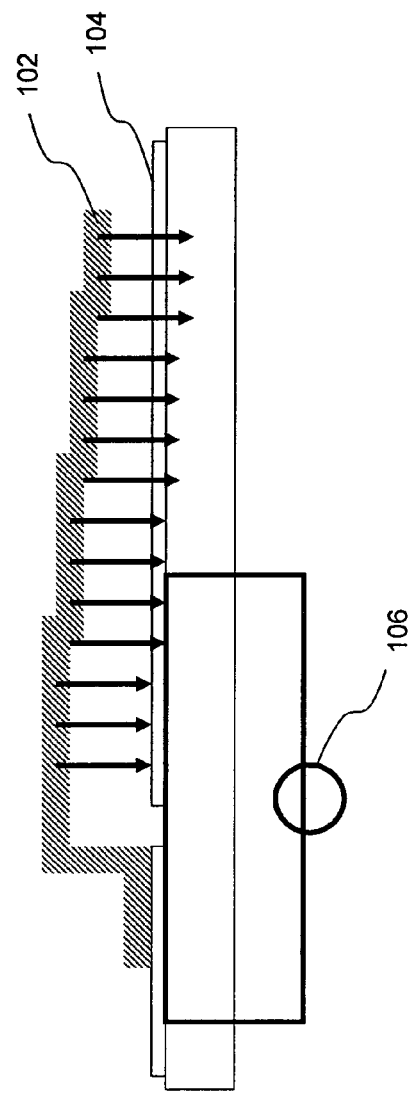
FIG. 1 illustrates a conventional micro-relay that is used as a nonvolatile memory cell for data storage.

FIG. 1 illustrates a conventional micro-relay 100 that is used as a non-volatile memory cell for data storage. The micro-relay 100 includes a first metal 102, which is shaped as a cantilever beam, and a second metal 104, which is placed under the first metal 102. In write operation, the micro-relay 100 is initially set up that the first metal 102 is not touching the second metal 104. A voltage is then applied to a controller 106 to force down the first metal 102 towards the second metal 104. After the voltage applied to the controller 106 reaches a threshold value, the first metal 102 is forced down to the second metal 104 completely, thereby making a contact therebetween. The state of whether the first and second metals 102 and 104 are in contact can be used to represent a bit of data. The cantilever-shaped first metal 102 is designed to stay in contact with the second metal 104 even after the applied voltage is removed. Thus, the micro-relay 100 can function as a non-volatile memory cell.

One drawback of a memory device that uses such micro-relay is its bulky size. Such memory device must include a large number of micro-relays, each of which can have a width greater than 100 µm. This renders the application of micro-relay memory devices impractical.

Figure 2A:
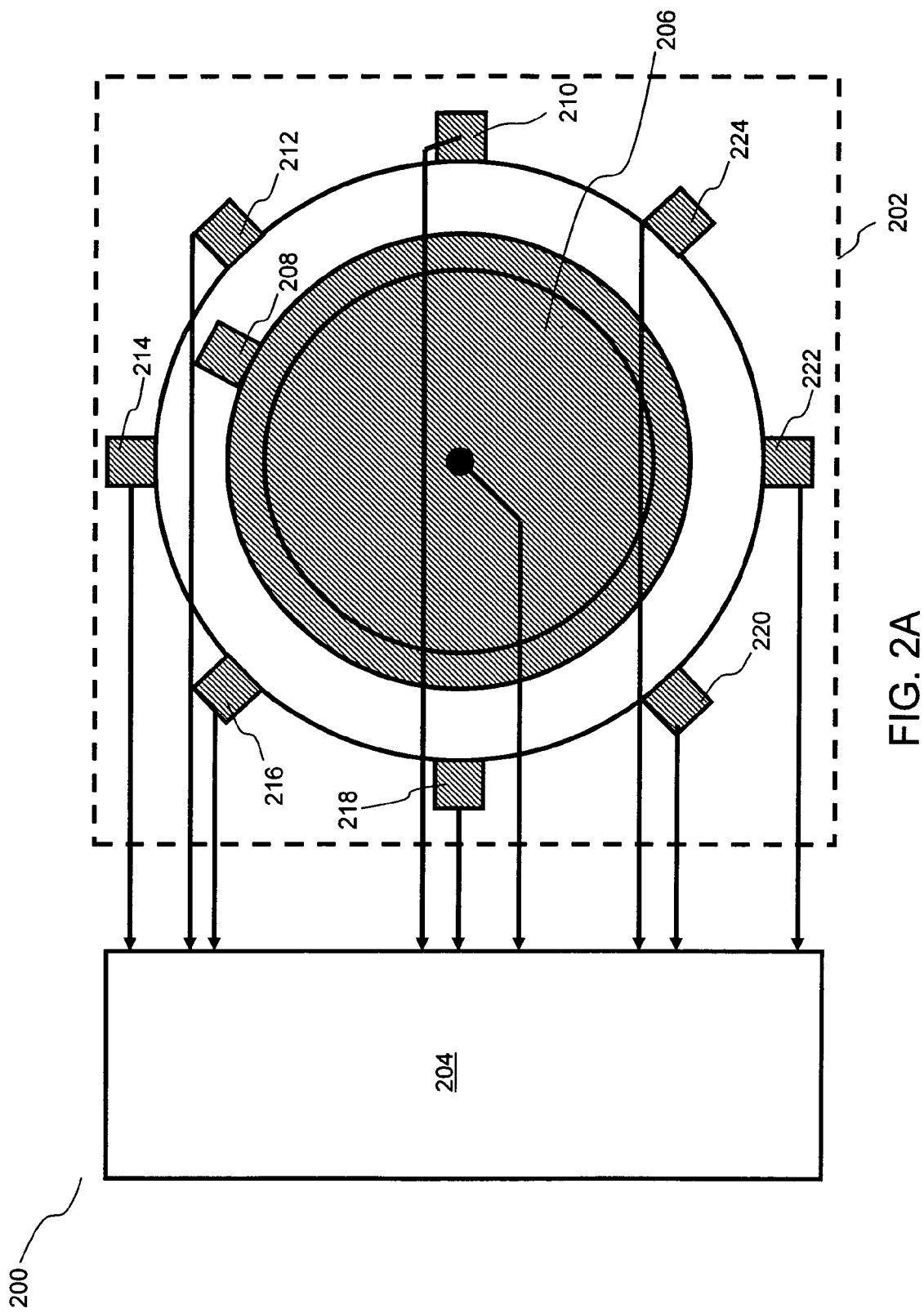
FIG. 2A illustrates a micro-motor memory device in a write operation in accordance with one embodiment of the present invention.

FIG. 2A illustrates a micro-motor memory device 200 in write operation in accordance with one embodiment of the present invention. The micro-motor memory device 200 includes a rotor 206 for rotating about an axis, and a stator 202 placed adjacent thereto for engaging the rotor 206 to rotate. The rotor 206 includes at least one indicator 208 whose angular position can be used to represent stored data. In this embodiment, the indicator 208 is a tab protruding from a perimeter of the rotor 206. However, is can be implemented in other forms, such as a marked region within the perimeter of the rotor 206. The rotor 206 and the stator 202 are constructed on a semiconductor substrate using MEMS technology, so that they can be in a scale of micrometers or nanometers. It is noted that the micro-motor memory device 200 can include an array of micro-motors, such as the one collectively represented by the rotor 206 and the stator 202. The micro-motors can be stacked upon one anther, so that a three-dimensional micro-motor array can be provided for saving the layout space. For illustrative purposes, only one set of rotor 206 and stator 202 is shown in FIG. 2A.

The micro-motor memory device 200 stores data by adjusting an angular position of the indicator 208. The stator 202 includes a plurality of marks placed at one or more locations around the rotor 206. For purposes of description, eight fixed marks 210, 212, 214, 216, 218, 220, 222, and 224 are illustrated in this embodiment. In this embodiment, the marks electromagnetically engage the rotor 206 to rotate, such that the indicator can be moved to a predetermined angular position with respect to a reference point, such as the mark 214, depending upon the electrical charges applied to the marks and indicator 208 by the write control device 204. For example, the indicator 208 that contains negative charges has an initial angular position aligning with the mark 214. If the mark 214 is applied with a negative voltage while the mark 212 is applied with a positive voltage and the other marks 214, 216, 218, 220, 222, and 224 remain neutral, the indicator 208 may advance one angular position from the mark 214 to the mark 212. Since the positioning of the indicator 208 can be changed by simply having the write control device 204 apply a new round of electrical charges in another cycle, this micro-motor memory device 200 can be programmed multiple times.

In this embodiment, the indicator 208 will remain at the same predetermined angular position, after the write control device 204 removes the electrical charges previously applied to the marks. Thus, the memory device 200 can function as a non-volatile memory device. However, it is noted that the micro-motor memory device 200 can also function as a volatile memory device where the indicator 208 is designed to automatically return to its original position after the electrical charges are removed from the marks.

The angular position resolution of the indicator 208 can vary depending on application needs. If the indicator 208 has an infinite number of angular positions with respect to a reference point, it can be used to represent data that have an analog value. If the indicator 208 has a finite number of angular positions, it can be used to represent data that have a digital value. For example, if the angular position resolution of the indicator 208 can be narrowed down to 256 incremental steps, it can be used to encode eight bits of data, which provide 256 various combinations of bits.

In this embodiment, every two neighboring marks are spaced by the same angle. However, it is understood that they can be spaced by different angles as well. It is noted that other types of stators 202 can also be used to drive the rotor 206. For example, the stator 202 can be replaced by an actuator that physically engages a gear type of rotor for rotation. Such actuator may have a number of teeth engaged with those of the rotor for rotating the same. It is understood that such actuator can be designed by persons skilled in the art of MEMS technology, and therefore it is not herein described in detail.

It is understood that micromachining uses equipments and processing techniques that are similar to those used by the IC fabrication technology. For example, the micro-motor memory device 200 is constructed by multiple processing steps, much like the fabrication of ICs. The micro-motor memory device 200 requires deposition of layers of sacrificial and structural material on the surface of a semiconductor substrate. It is then patterned, leaving materials only at where the designer wishes.

Figure 2B:
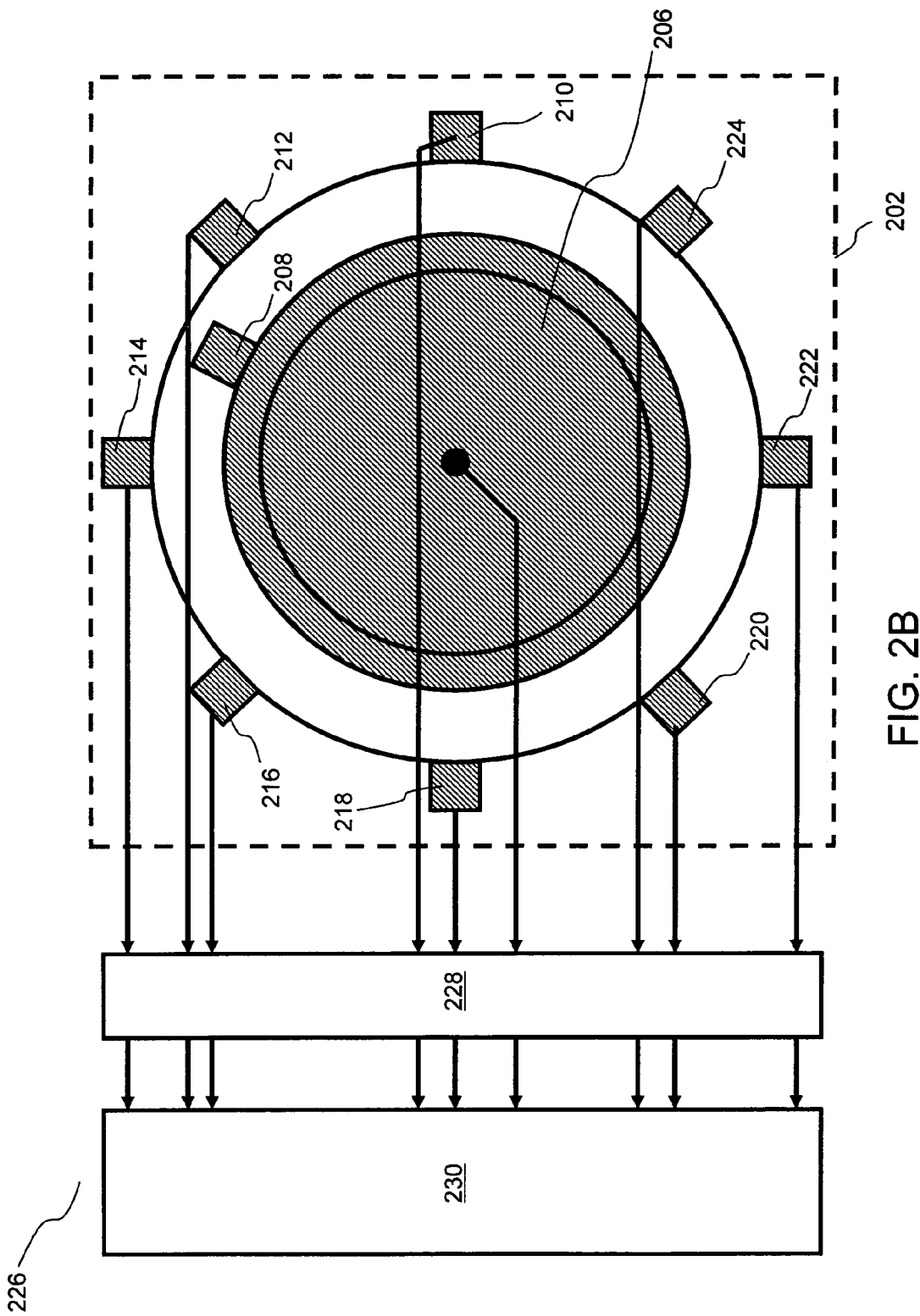
FIG. 2B illustrates a micro-motor memory device in a read operation in accordance with the embodiment of the present invention.

FIG. 2B illustrates a micro-motor memory device 226 in a read operation in accordance to the embodiment of the present invention. In the read operation, the angular position of the indicator 208 needs to be located by sensing the voltages at the marks 210, 212, 214, 216, 218, 220, 222, and 224. The mark that is the closest to the indicator 208 will have a voltage substantially different from those at the other marks. For example, if the indicator 208 is very close to the mark 212, the voltage at the mark 212 will be higher due to the capacitor coupling effect therebetween, while the voltages at the rest of the marks remain at the same level. The voltages at all of the marks are sensed by the sense amplifier 228, which outputs a sensing signal to the read control device 230, which then converts the sensing signal into an output signal representing the data stored in the micro-motor memory device 226.

It is noted that the write control device 204 shown in FIG. 2A and the read control device 230 need not be implemented in different circuitries. They may be implemented in the same circuitry.

This invention provides a scheme whereby the positioning of an indicator within a micro-motor can be used for representing stored data. Since the micro-rotor is fabricated using MEMS technology, its size can be made extremely small. The indicator can be rotated by applying an electrical force. Depending on the angular position resolution of the indicator, each micro-motor memory cell can store multiple bits. This is a significant advantage over the conventional floating gate memory cell, which can only store one bit per cell. Furthermore, since the micro-motor memory device does not use gates oxides, it can avoid the problem of oxide failure, which may happen to the conventional floating gate memory device. The conventional floating-gate based cells can only be programmed $10^4$-$10^5$ times, while the MEMS memory can be programmed at least $10^9$ that only limited by material fatigue The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A micro-motor memory device comprising:
   at least one rotor having at least one indicator for rotating about an axis; and
   at least one stator placed adjacent to the rotor for electromagnetically or physically engaging the rotor to rotate the indicator to at least one predetermined angular position for representing stored data,
   wherein the rotor and the stator are constructed on a semiconductor substrate by using micro-electro-mechanic-system technology.

2. The micro-motor memory device of claim 1 wherein the predetermined angular position represents an analog value.

3. The micro-motor memory device of claim 1 wherein the predetermined angular position represents a digital value.

4. The micro-motor memory device of claim 1 wherein the stator is an actuator that physically engages the rotor.

5. The micro-motor memory device of claim 1 wherein the stator comprises one or more marks placed at one or more locations around the rotor for electromagnetically engaging the same.

6. The micro-motor memory device of claim 5 wherein the indicator rotates away from the mark that exhibits an electric charge of a polarity same as that of the indicator.

7. The micro-motor memory device of claim 6 wherein the indicator rotates towards the mark that exhibits an electric charge of a polarity different from that of the indicator.

8. The micro-motor memory device of claim 7 wherein the indicator remains at the same angular position after the electrical charges at the indicator and the mark are removed.

9. The micro-motor memory device of claim 8 further comprising a write control device for controlling the electrical charges applied to the indicator and the marks.

10. The micro-motor memory device of claim 9 further comprising a sense amplifier for sensing voltages at the marks to generate a sensing signal representing the predetermined angular position of the indicator, wherein the voltage at the mark that is closest to the indicator exhibits a substantially different value from those at the other marks.

11. The micro-motor memory device of claim 10 further comprising a read logic device for converting the sensing signal into an output signal representing the stored data.

12. A micro-motor memory device constructed on a semiconductor substrate by using micro-electro-mechanic-system technology, comprising:
- at least one rotor having at least one indicator for rotating about an axis; and
- at least one stator having one or more marks placed at one or more locations around the rotor for electromagnetically engaging the rotor to rotate the indicator to at least one predetermined angular position for representing stored data in write operation,
- wherein the predetermined angular position of the indicator is sensed to generate an output signal representing the stored data in read operation.

13. The micro-motor memory device of claim 12 wherein the indicator rotates away from the mark that exhibits an electric charge of a polarity the same as that of the indicator, and towards the mark that exhibits an electric charge of a polarity different from that of the indicator.

14. The micro-motor memory device of claim 13 wherein the indicator remains at the same angular position after the electrical charges at the indicator and the mark are removed.

15. The micro-motor memory device of claim 14 further comprising a write control device for controlling the electrical charges applied to the indicator and the marks.

16. The micro-motor memory device of claim 15 further comprising a sense amplifier for sensing voltages at the marks to generate a sensing signal representing the predetermined angular position of the indicator, wherein the voltage at the mark that is closest to the indicator exhibits a substantially different value from those at the other marks.

17. The micro-motor memory device of claim 16 further comprising a read logic device for converting the sensing signal into the output signal representing the stored data.

18. A method for storing data in a micro-motor memory device having at least one rotor with at least one indicator and at least one stator with one or more marks placed around the rotor for rotating the same, the method comprising:
- rotating the indicator of the rotor to a predetermined angular position for representing stored data in a write operation; and
- sensing the predetermined angular position of the indicator for generating an output signal representing the stored data in a read operation,
- wherein the rotor and the stator are constructed on a semiconductor substrate by using micro-electro-mechanic-system technology.

19. The method of claim 18 wherein the step of rotating further comprises:
- charging the indicator and the mark adjacent thereto with electrical charges of the same polarity for rotating the indicator away from that mark; and
- charging the indicator and the mark adjacent thereto with electrical charges of different polarities for rotating the indicator towards that mark.

20. The method of claim 19 wherein the step of sensing further comprises identifying the mark that exhibits a substantially different voltage from that of the other marks for generating a sensing signal representing the predetermined angular position.

* * * * *